J. H. SHAW.
GARDEN HOE.
APPLICATION FILED SEPT. 20, 1909.
946,566.
Patented Jan. 18, 1910.
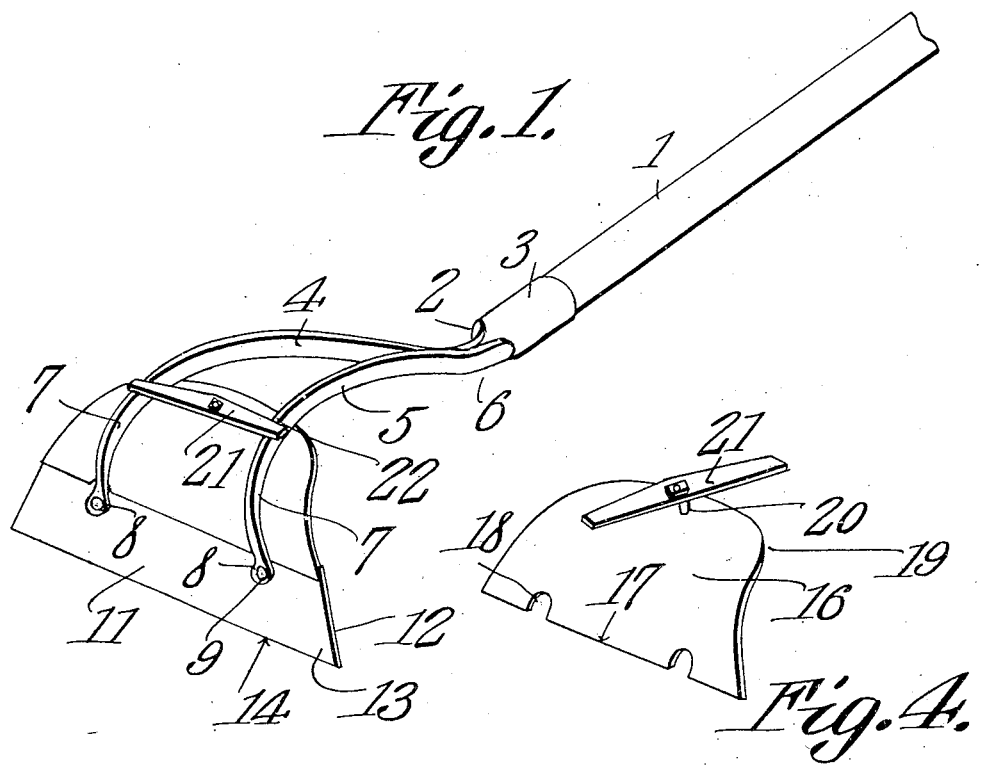
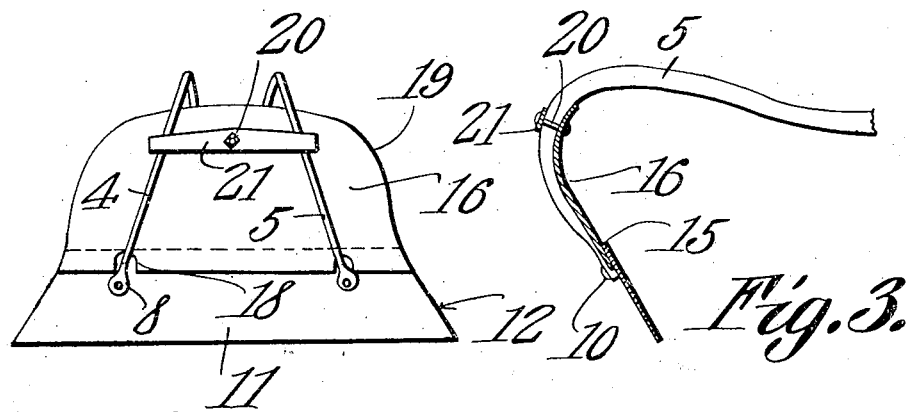
Inventor
John H. Shaw.
Witnesses

UNITED STATES PATENT OFFICE.

JOHN H. SHAW, OF FLORENCE, KANSAS.

GARDEN-HOE.

946,566.  Specification of Letters Patent.  Patented Jan. 18, 1910.

Application filed September 20, 1909. Serial No. 518,533.

*To all whom it may concern:*

Be it known that I, JOHN H. SHAW, a citizen of the United States, residing at Florence, in the county of Marion and State of Kansas, have invented a new and useful Garden-Hoe, of which the following is a specification.

My invention relates to garden hoes and has for an object to provide a hoe having a large area of blade surface which is disposed in the most advantageous manner relatively to the handle to obtain the maximum of work with a minimum amount of labor.

Another object is to provide a hoe having its cutting blade so secured to the handle that the earth will readily pass over the blade and not adhere to the members connecting the blade with the handle as in hoes hitherto constructed.

A still further object is to provide a hoe having a sectional blade in which the cutting portion or blade proper is secured to the handle independent of the body portion, which latter may be readily secured to or released from the handle when desired.

With the above advantages and other objects in view which will appear as the description proceeds, my invention embraces certain novel details of construction and combination of parts which will be hereinafter more fully described and claimed.

In the accompanying drawing forming part of this specification;—Figure 1 is a perspective view of a garden hoe constructed in accordance with my invention. Fig. 2 is an end elevation of my improved hoe. Fig. 3 is a side elevation of the hoe blade and a portion of the connecting shank. Fig. 4 is a detail perspective view of the detachable body portion.

Like characters of reference designate similar parts in the view shown.

Referring to the drawing a hoe is shown having a handle 1 provided at one end with a reduced end to receive the socket 2, the body 3 of which is driven or otherwise rigidly secured to said reduced end. Integral with the socket is a pair of shanks 4 and 5 which connect the hoe blade to the handle. The connecting shanks 4 and 5 are preferably formed from flat bars of metal and are curved in contour, one end of each shank being straightened, as shown at 6 and the opposite end 7 being bent downward in a plane nearly perpendicular to the plane of the straightened portion. The straightened portions of the shanks are brought together and welded or otherwise secured to the socket 2. The curved portion of each shank is off set outwardly at a point adjacent the straightened portion so that the free extremities of the shanks diverge from the end of the handle when in operative position. Formed upon the free extremity of each shank is a head 8 having an annular opening 9 in which a bolt or rivet 10 is inserted to secure the cutting blade to the extremity of the shank.

The cutting blade 11 consists of a thin sheet of metal considerably greater in length than in width. The lateral edges of the blade are inclined upwardly, as shown at 12 so that an acute point 13 is formed with the cutting edge 14 of the blade by means of which the earth may be readily loosened. The cutting blade is provided with annular openings adjacent each end and a slight distance below its top edge 15 to receive the rivets 10 carried by the extremities of the curved shanks. It will thus be seen that the long narrow blade will have a considerable working surface, any portion of which may be used at one time and that when in operation the loosened earth will readily slide over the narrow blade and between the flattened shanks and will not be pulled along in front of the blade, as in hoes of the ordinary construction. The blade permits a large amount of earth to be loosened with one stroke of the hoe, the earth immediately slipping over the top edge of the hoe and forming again a level surface which is impossible to obtain by blades of considerable depth.

In order to obtain a greater amount of working surface, a body portion 16 is provided. The body portion 16 consists of a thin sheet of metal, the lower edge 17 of which is approximately equal in length to the top edge 15 of the cutting blade and is adapted to be inserted between the latter and adjacent portion of the shanks, a pair of recesses 18 being formed in the bottom edge of the body portion which receive the opposed edges of the shanks, which latter operate to securely clamp the lower edge of the body portion 16 in engagement with the top edge of the cutting portion 11. The body portion 16 is curved in outline remote from its lower edge 17 so as to conform to the outline of the curved shanks, the marginal edges of the body portion being rounded, as shown at 19 so that no sharp corners will be formed upon the top edge of the hoe blade. A stud 20 is disposed adjacent the top edge of the body portion and is adapted to project intermediate the curved shanks when the body portion is placed in operative position. A bar 21 is swiveled intermediate its ends upon the free end of the stud 20 and is adapted to engage alined notches 22 formed in the upper edges of the curved shanks whereby to clamp the body portion in operative position.

The body portion 16 may be secured in operative position by simply engaging its bottom edge over the top edge of the cutting portion until the recesses 18 are engaged with the curved shanks when a half turn of the bar or locking member 21 will engage the terminals of the locking member in the alined slots 22 and securely clamp the body portion to the curved shank. To release the body portion from operative position, the operation above described is reversed.

Although in the above description the body portion is described as being secured to the curved shanks by a swiveled locking member 21, it is not intended to limit the construction to this form, as the body portion may be secured in any other preferred manner and operate equally as effectively.

From the foregoing description taken in connection with the accompanying drawings, it is thought that the construction and operation of my invention will be easily understood without a more extended explanation, it being understood that various changes in the form, proportion and minor details of construction may be made without sacrificing any of the advantages or departing from the spirit of the invention.

What is claimed is:—

1. A hoe having a handle, a pair of curved shanks diverging from said handle, and a blade consisting of a cutting portion attached to the free ends of said shanks, and a body portion removably secured to said shanks above said cutting portion.

2. A hoe having a handle, a pair of curved shanks secured at one end to said handle and diverging from thence to their free ends, and a blade consisting of a cutting portion secured adjacent its ends to the extremity of said shanks, and a body portion removably secured to the intermediate portion of said curved shanks.

3. A hoe having a handle, a pair of curved shanks secured to one end of said handle and extending thence in diverging planes, a blade consisting of a cutting portion secured to the extremities of said shanks and a removable body portion supported by said shanks above said cutting portion, and means for securing said body portion to said shanks.

4. A hoe having a handle, a pair of curved shanks secured to one end of said handle and having their extremities spaced apart, a blade consisting of a cutting portion rigidly secured adjacent its ends to the extremities of said shanks and a body portion supported upon the top edge of said cutting portion, and a locking member carried by said top portion and engageable with the intermediate portion of said shanks.

5. A hoe having a handle, a pair of hook shaped shanks having one end secured to said handle and diverging from thence to their extremities, a blade consisting of a cutting portion connected to the extremities of said shanks and a curved body portion disposed above said cutting portion and shaped to conform to the outline of said shanks, a stud carried by said body portion adapted to project between said shanks, and a locking member swiveled on the free extremity of said stud and engageable with said shanks.

In testimony that I claim the foregoing as my own, I have hereto affixed my signature in the presence of two witnesses.

JOHN H. SHAW.

Witnesses:
S. W. Bloom,
Roy Kelly.